(12) United States Patent
Brewton et al.

(10) Patent No.: US 7,797,674 B1
(45) Date of Patent: Sep. 14, 2010

(54) INDEPENDENT COMPONENT-WIDE PARAMETER SPECIFICATION FOR GRAPHICAL LANGUAGES

(75) Inventors: Nathan Brewton, Medford, MA (US); Andrew Grace, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 800 days.

(21) Appl. No.: 11/024,526

(22) Filed: Dec. 28, 2004

(51) Int. Cl.
G06F 9/44 (2006.01)

(52) U.S. Cl. ...................... 717/105; 717/104

(58) Field of Classification Search .......... 717/104–105
See application file for complete search history.

(56) References Cited

U.S. PATENT DOCUMENTS

| | | | | |
|---|---|---|---|---|
| 4,901,221 A * | 2/1990 | Kodosky et al. | ............. | 715/771 |
| 4,914,568 A * | 4/1990 | Kodosky et al. | ............. | 715/763 |
| 5,291,587 A * | 3/1994 | Kodosky et al. | ................ | 703/2 |
| 5,301,301 A * | 4/1994 | Kodosky et al. | .............. | 716/11 |
| 5,301,336 A * | 4/1994 | Kodosky et al. | ............. | 715/846 |
| 5,481,741 A * | 1/1996 | McKaskle et al. | ........... | 345/522 |
| 5,610,828 A * | 3/1997 | Kodosky et al. | .............. | 716/11 |
| 6,064,812 A * | 5/2000 | Parthasarathy et al. | ...... | 717/105 |
| 6,282,699 B1 * | 8/2001 | Zhang et al. | ................ | 717/109 |
| 6,437,805 B1 * | 8/2002 | Sojoodi et al. | .............. | 715/763 |
| 6,690,981 B1 * | 2/2004 | Kawachi et al. | ............... | 700/83 |
| 6,976,222 B2 * | 12/2005 | Sojoodi et al. | .............. | 715/763 |
| 6,990,652 B1 * | 1/2006 | Parthasarathy et al. | ...... | 717/107 |
| 7,120,877 B2 * | 10/2006 | Gabbert et al. | ............. | 715/804 |
| 7,134,109 B2 * | 11/2006 | Hayles | ......................... | 716/6 |
| 7,216,334 B2 * | 5/2007 | Kodosky et al. | ............ | 717/109 |
| 7,275,026 B2 * | 9/2007 | Mani et al. | .................... | 703/13 |
| 7,337,102 B2 * | 2/2008 | Mosterman | ................... | 703/21 |
| 7,350,189 B1 * | 3/2008 | Bartlett | ....................... | 717/104 |
| 7,424,684 B2 * | 9/2008 | Orofino et al. | ............. | 715/762 |
| 7,487,080 B1 * | 2/2009 | Tocci et al. | .................... | 703/22 |
| 2005/0257195 A1 * | 11/2005 | Morrow et al. | ............. | 717/109 |
| 2005/0278162 A1 * | 12/2005 | Ciolfi et al. | ................... | 703/22 |

* cited by examiner

*Primary Examiner*—Wei Y Zhen
*Assistant Examiner*—Qing Chen
(74) *Attorney, Agent, or Firm*—Lahive & Cockfield, LLP; Kevin J. Canning; Neslihan I. Doran (57) ABSTRACT

The present invention provides systems and methods for providing two or more parameterization functions which are associated with a single graphical language environment. Such an arrangement allows for modeling of complex models with interaction across multiple domains. In the present invention, the graphical language environment include components, represented by nodes, that have multiple parameterization functions associated with them, yet operate within a single graphical language environment. A change in one parameterization function associated with one or more nodes is propagated across all associated nodes within the domain.

38 Claims, 9 Drawing Sheets

INDEPENDENT COMPONENT-WIDE PARAMETER SPECIFICATION FOR GRAPHICAL LANGUAGES

FIELD OF THE INVENTION

The present invention relates to integration of multiple domains into a single graphical language environment. In particular, these multiple domains within a single graphical language environment can have different system parameters associated with them such that individual portions of the graphical language environment contain different system parameters associated with the domain.

BACKGROUND OF THE INVENTION

Historically, graphical language environments are use in specifying systems for simulation purposes. The specified system can be steady state system, with no variation in system parameters, or can be a dynamic system that is variable in nature in response to various stimuli. One such example of a dynamic system, as often modeled in a graphical language is an automotive driveline. External system parameters can be continuously varied within the simulation such that the modeled system is tested under the proposed operating conditions. For example, angular velocity of drive shafts and axels can be continuously varied, as well as forces and torques within the system. In light of this, a dynamic model can be created such that the proposed automotive driveline can be rigorously tested prior to actual fabrication and prototyping.

Traditional graphical language environments are comprised of a plurality of individual nodes. These nodes, when linked together, represent the system to be modeled. These nodes have associated with them a node labeling function that associates with each node a domain. Connected components of like labeled nodes are known as domain components. Additionally, associated with each domain is a domain parameterization that defines the parameters associated with each node as well as provides a means by which a graphical language user can modify the parameters of the domain. Modifying domain parameters allows a user to simulate alternative environments that the modeled system may operate in, and subsequently evaluate the results of these changes across the various nodes of the domain. Traditional graphical languages only provide for a single domain parameterization, such that parameters defined for use with the simulated model applies to all nodes of the simulated model. The defining of a set of parameters associated with a set of node is done globally from within the model environment during the creation of the model. For example, a user may initially define an angular velocity, for use with the automotive driveline example, when initially modeling the driveline. Using such an approach, traditional graphical languages allow for the propagation of this parameter across all nodes of the system which are subsequently attached to the node defining angular velocity, such that simulation and evaluation of the modeled system using this parameter is quickly accomplished.

Existing graphical languages, however do not provide a mechanism for allowing multiple parameters to be passed to predefined regions, comprises of like labeled nodes, of the simulated model environment in readily modified manner. Additionally, when modeling numerous systems, it is beneficial to allow a global variable property to propagate across a plurality of node wherein the value of the property is continually changing. Furthermore, existing graphical model environments do not provided for a mechanism wherein only a region of the graphical model receive a first external parameter and a second regions of the graphical model receives a second external parameter. In view of this, when working with a system that spans two or more external system parameters, wherein the propagation of a first parameter is only intended for a first region of the model and the propagation of a second parameter is only intended for a second region of the domain it becomes essential to split the system into two or more models, each using the proper external parameters. Using two graphical models, however, results in the inability graphically track and evaluate the effects of a change in first system parameters on the second system that does not share this parameter. The inherent limitations of using two distinct model environments are further compounded when working with variable time driven parameters.

SUMMARY OF INVENTION

The present invention relates to graphical language modeling environments wherein two or more parameters can be associated with selected nodes within the graphical language model.

Providing a mechanism wherein two or more parameterization functions can be associated with a single graphical language environment offers numerous benefits. Firstly, when one is faced with a complex system that is operating in a manner best represented by multiple parameterization functions associated with various nodes within the system, the need to split the system into two or more discrete models is no longer necessary. In light of this, a graphical language model can include components, represented by nodes, that have multiple parameterization functions associated with them, yet operate within a single graphical language model. A change in one parameterization functions associated with one or more nodes, therefore, is propagated across all associated nodes within the domain and allows for the change in a select node or nodes to thereby effect other nodes within the system. Example parameterization functions may include, but are not limited to, definitions of system gravity components or temperature. Furthermore, these parameterization functions may be constant in nature, may be time dependent, or may be some combination thereof.

The benefits of such an arrangement are best represented by example. In a graphical model environment that represents a three dimensional system including a satellite in orbit, and a earth based tracking station the entire model is under the influence of two different gravity vectors, namely one of the earth based tracking subsystem and one applicable to the orbiting satellite subsystem. Such a model would therefore be best represented by two domains, each domain have a mechanical environment that includes a gravity vector applicable to the domain. A prior art graphical language, in contrast would require that the entire systems be represented by two distinct systems, each of which has an applicable gravity vector associated with it. Such an arrangement would be typically modeled using two separate graphical language models, such that there is no interaction between the two models based upon a change in a parameterization function in one of the models. In light of this, a change in the first system, namely the earth based tracking station, would not be reflected in the current status and behavior of the secondary satellite based system.

The present invention, in comparison, allows a user to define all of the nodes associated with a first subsystem, and further define the applicable gravity vector (i.e. a parameterization function) for these nodes. A similar set of steps is completed for the second subsystem such that the satellite nodes have the applicable gravity vector associated with them. Should the satellite be moved into orbit around a planet with a different gravity vector, the parameterization function representing the gravity vector associated with the satellite nodes is simply modified by a graphical language user and the results of this change in gravity vector are reflected in both the satellite subsystem as well as the earth based subsystem. In light of this, the present invention provides a means by which a complex simulation spanning multiple environments can have multiple parameterization functions associated with the nodes in each environment such that changes in one environment results in a system wide change.

In accordance with one embodiment of the present invention, in a block diagram graphical model, a method comprises the steps of providing a first and second domain. The first domain is associated with a first region of the block diagram model and the second domain is associated with a second region of the block diagram model. Following said associations, parameters specific to the first and second domains are propagated to the first and second regions of the block diagram model. The first and second regions of the block diagram model can be defined using two or more partitioning blocks, wherein the partitioning blocks can set the bounds of the region, and thereby serve to indicate the region on which a parameters is applicable. The regions can contain a single block or can contain a plurality of blocks associated with the region.

In accordance with another aspect of the present invention, a method is recited form extending a graphical simulation language by first providing a plurality of domain components associated with the graphical simulation environment. Additionally, a parameterization node is associated with each domain component wherein the parameterization node can represent one or more elements within the graphical simulation language. Associated with each parameterization node is a parameterization function such that the parameterization function includes a means for specifying parameters to be associated with each domain component. The parameterization node can be defined using a partition mechanism, such that the partition mechanism defines a region including all like labeled parameterization nodes wherein a parameter can be associated with all of these like labeled parameterization nodes within the graphical simulation language.

In accordance with another aspect of the present invention a method for providing a plurality of environmental parameters within a block diagram model is recited. The method includes the steps of defining the blocks within the block diagram model such that a partition mechanism can be employed to define regions of the block diagram model to be linked together. These partitioned regions are then located and a determination is made as to where environmental parameters within the block diagram model are to propagate. For example, a first regions defined by a partition mechanism can receive a first environmental parameter. Following the determination of the applicable regions over which a parameter propagates, the parameter is then propagated across the predefined region. The partitioning mechanism of the present embodiment can either be manually configured, or may be automatically configured for use with the block diagram model. Additionally the environmental parameter can specify numerous attributes of the model, including solver strategy, or physical environment.

BRIEF DESCRIPTION OF FIGURES

An illustrative embodiment of the present invention will be described below relative to the following drawings.

DETAILED DESCRIPTION

The present invention provides systems and methods for modeling a system using a graphical language model environment such that multiple parameters can be associated with discrete regions of the modeled system. These discrete regions can be comprised of a single node or can span several nodes within the model environment. For the purpose of clarity, a "node" is herein defined as a discrete element within a graphical language environment for representing a portion of the system modeled by the graphical language. For example, in a graphical language, a node may be a single joint within a complex mechanical apparatus, or can be a body having a mass and center of gravity associated with it. Such examples are solely used to illustrate the composition of a node within a graphical language and are not exhaustive representation of elements that can represent a node.

Furthermore, the term "like labeled node" is herein defied as one or mode nodes which have the same parameterization function associated with said node or nodes. Labeling a node results in the association of the node with one of a infinite set of possible labels or identifiers.

Furthermore, the term "parameterization function" is herein defined as a function representing parameters associated with nodes of a graphical language. For example, as set forth prior, a parameterization function can represent a gravity vector applicable to nodes in a graphical model. A modification of a parameterization function, therefore, results in a change in all like labeled nodes associated with the parameterization function. A parameterization function can be manually changed by a user of a graphical language environment, or can be modified as a function of time, or in response to a signal. One skilled in the art will readily recognize that the modification of a parameterization function using the aforementioned examples is a non-exhaustive list used to represent potential variables which may change a parameterization function. One skilled in the art will recognize that numerous alternative variable exist which may operate on a parameterization function. One skilled in the art should readily recognize that multiple parameterization functions may be stored for use across like labeled nodes such that a evaluation of graphical language model performance and behavior can be readily tested using different parameters.

The terms "domain" is herein defined as a collection of like labeled nodes within a graphical language environment. A domain, as understood in the present invention, can include one like labeled node, or can include a plurality of like labeled nodes.

Furthermore a "partition block" is herein defined as any item associated with a graphical language model that provides a mechanism for defining a region of the graphical language environment, comprised of like labeled nodes, over which a parameterization function propagates.

Figure 1:
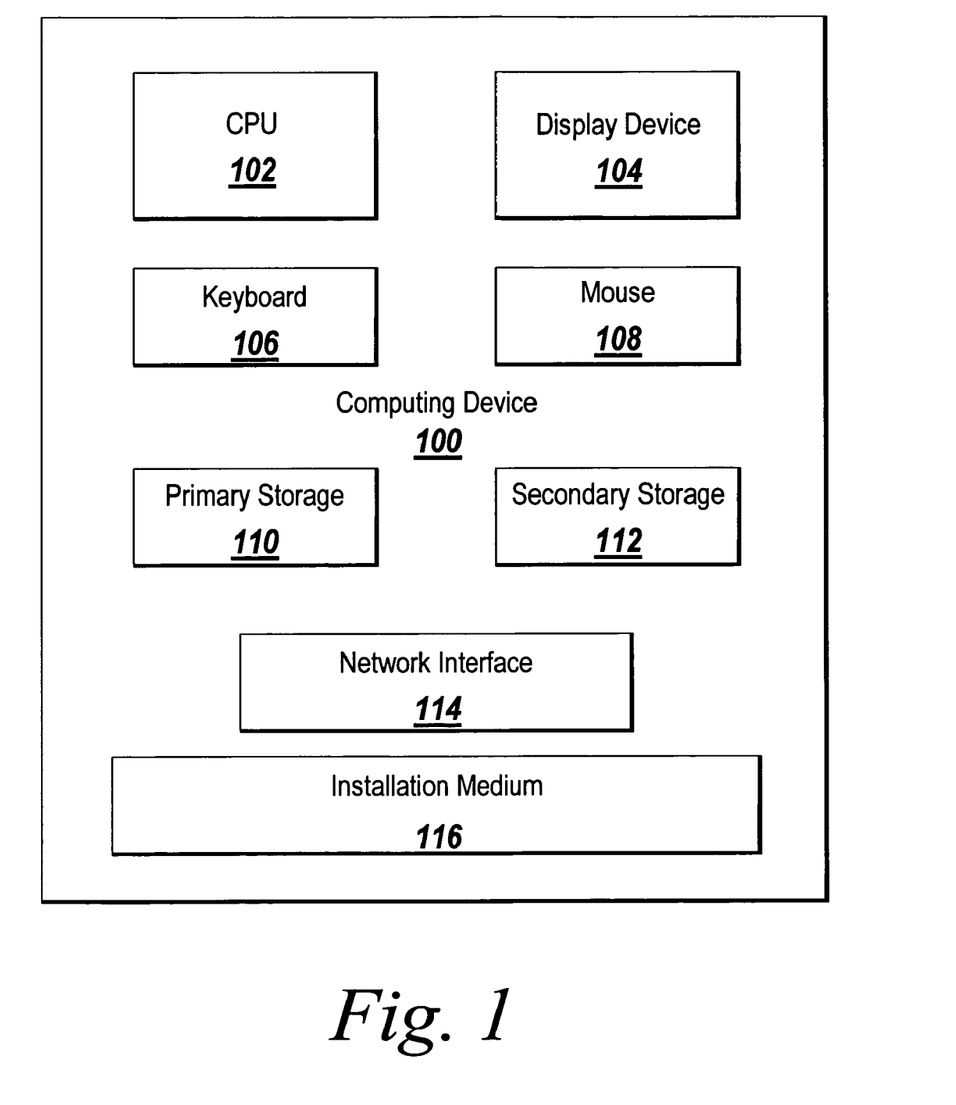
FIG. 1 is an exemplary model illustrating an environment suitable for practicing the illustrative embodiment of the present invention.

FIG. 1 depicts an environment suitable for practicing an illustrative embodiment of the present invention. The environment includes a computing device 12 having memory 16, on which software according to one embodiment of the present invention may be stored, a processor (CPU) 14 for executing software stored in the memory 16, and other programs for controlling system hardware. The memory 16 may comprise a computer system memory or random access memory such as DRAM, SRAM, EDO RAM, etc. The memory 16 may comprise other types of memory as well, or combinations thereof. A human user may interact with the computing device 12 through a visual display device 24 such as a computer monitor, which may include a graphical user interface (GUI). The computing device 12 may include other I/O devices such a keyboard 20 and a pointing device 22, for example a mouse, for receiving input from a user. Optionally, the keyboard 20 and the pointing device 22 may be connected to the visual display device 24. The computing device 12 may include other suitable conventional I/O peripherals. The computing device 12 may support any suitable installation medium 26, a CD-ROM, floppy disks, tape device, USB device, hard-drive or any other device suitable for installing software programs such as the software of the block diagram model environment 105 of the present invention. The computing device 12 may further comprise a storage device 37, such as a hard-drive or CD-ROM, for storing an operating system and other related software, and for storing application software programs such as the block diagram model environment 105 of the present invention. Additionally, the operating system and the block diagram simulation environment 105 can be run from a bootable CD, such as, for example, KNOPPIX®, a bootable CD for GNU/Linux.

Additionally, the computing device 12 may include a network interface 28 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 28 may comprise a built-in network adapter, network interface card, PCMCIA network card, card bus network adapter, wireless network adapter, USB network adapter, modem or any other device suitable for interfacing the computing device 28 to any type of network capable of communication and performing the operations described herein. Moreover, the computing device 12 may be any computer system such as a workstation, desktop computer, server, laptop, handheld computer or other form of computing or telecommunications device that is capable of communication and that has sufficient processor power and memory capacity to perform the operations described herein.

The present invention provides a technical computing environment comprising a block diagram simulation environment 105. In brief overview, the block diagram simulation environment 105 allows for the construction and evaluation of an electronic circuit, a system and the like. In the block diagram simulation environment 105, customizable functional blocks are used to create an electronic circuit model that is representative of a desired electronic circuit, system or the like. The block diagram simulation environment 105 provides an environment for creating, designing, simulating, testing and verifying the electronic circuit, system or the like under a variety of conditions.

In an exemplary embodiment, the block diagram simulation environment 105, such as the SimMechanics® simulation environment or the MATLAB® program environment, both of which are offered by The MathWorks, Inc. of Natick, Mass., provides a graphical and interactive environment by which system designers can use a model-based design approach to model an electronic circuit. With a model-based design approach, the block diagram simulation environment 105 allows a system design to be an executable specification. An executable specification is a specification that provides a written design description of a system and from which code can be automatically generated for testing and prototyping in a working implementation. A working implementation of the simulation environment is defined as a region, a portion, or the entire model of the block diagram simulation environment when implemented in hardware and software located on one or more external processors. A model-based design approach such as this allows for changes or corrections to the system model to be quickly implemented, evaluated within the simulation environment, and then automatically reflected in code generated from the model for use by a processor or hardware component external to the simulation environment.

Figure 2A:
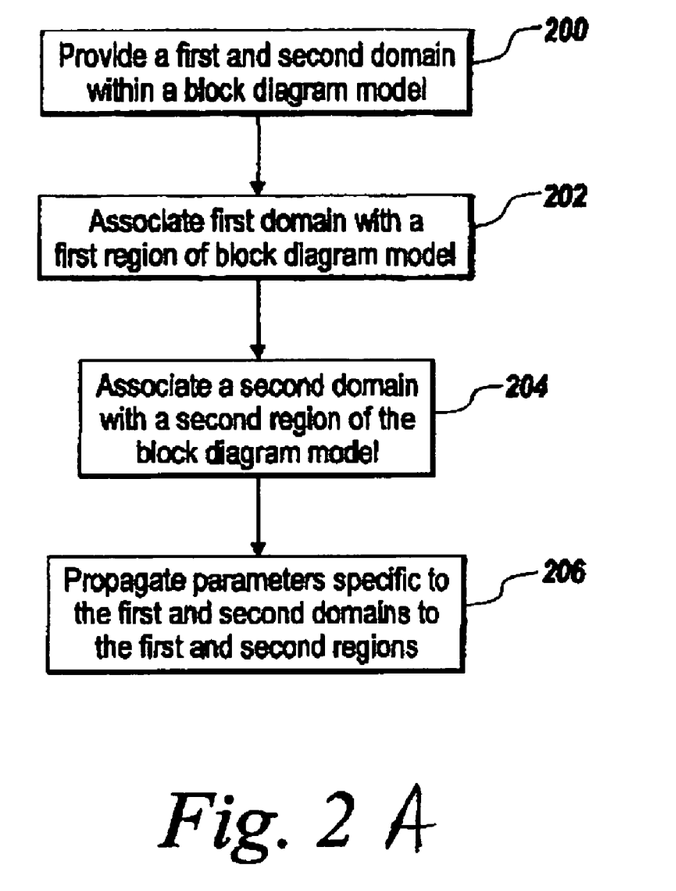
FIG. 2A is an exemplary flowchart that provides an overview of steps taken to practice the illustrative embodiment of the present invention when used in conjunction with a block diagram graphical model.

FIG. 2A is an exemplary flowchart that provides an overview of steps taken to practice the illustrative embodiment of the present invention when used in conjunction with a block diagram graphical model. In accordance with step 200 a first and second domain is provided within the block diagram graphical model wherein the first and second domain span two or more nodes within the block diagram graphical model. In accordance with step 202, the first domain is associated with a first region of the block diagram model, and furthermore the second domain is associated with a second region of the block diagram model (step 204) such that parameters specific to the first and second domains are propagated to the first and second regions of the block diagram model (step 206). The first region of the block diagram model can comprise one or more nodes, and the second region of the block diagram graphical model can include a distinct set of one or more nodes within the graphical block diagram model. In light of this, each like labeled node will have a distinct parameter associated with it.

Figure 2B:
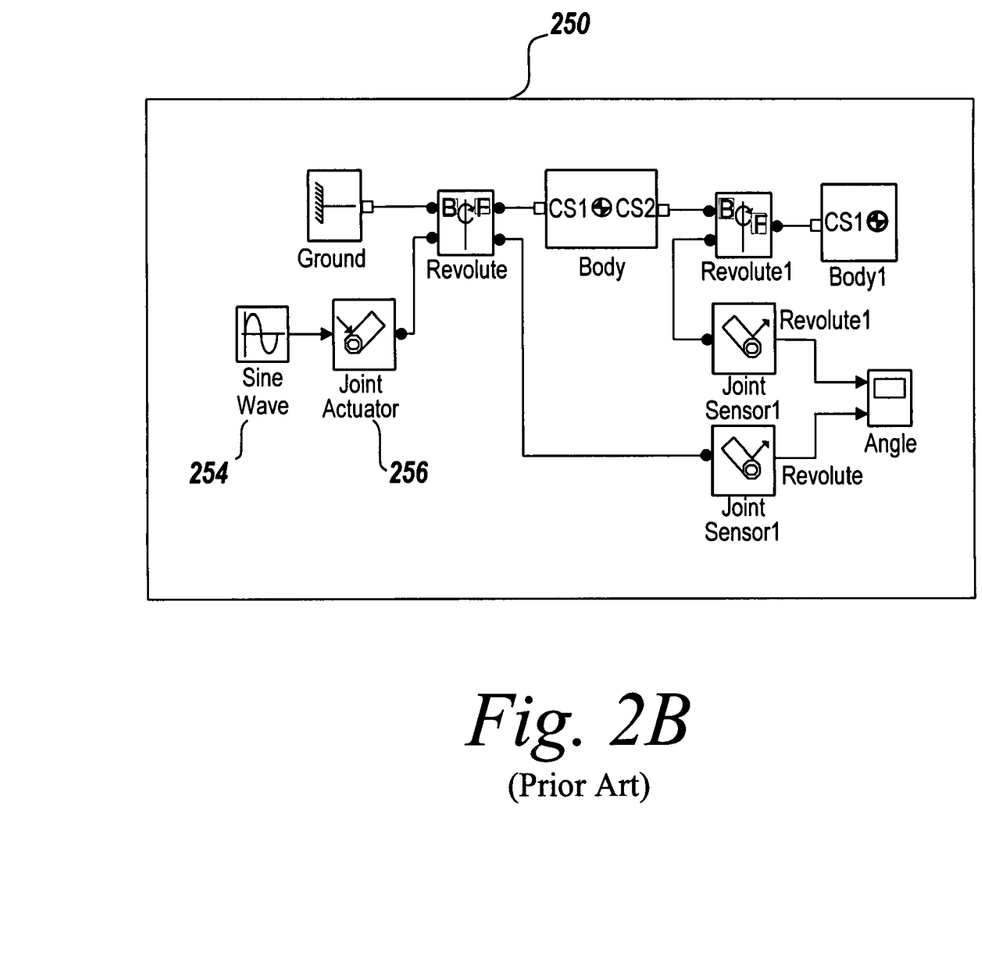
FIG. 2B is an illustrative example of a conventional graphical block diagram model 250 as understood by one skilled in the art.

FIG. 2B is an illustrative example of a conventional graphical block diagram model 250 as understood by one skilled in the art. The conventional block diagram model 250 contains a variable signal element 254 associated with a model element 256 of the model. In the present embodiment, the variable signal element 254 provides a variable force to the model element 256, namely a joint actuator, such that the variable force is propagated through the model 250. The properties associated with the variable signal element 254 may be defined by a user using a model-wide parameter defining schema. Should a user seek to change a parameter associated with the model, it is necessary to introduce a parameter via a similar schema to al elements of the model.

Figure 3:
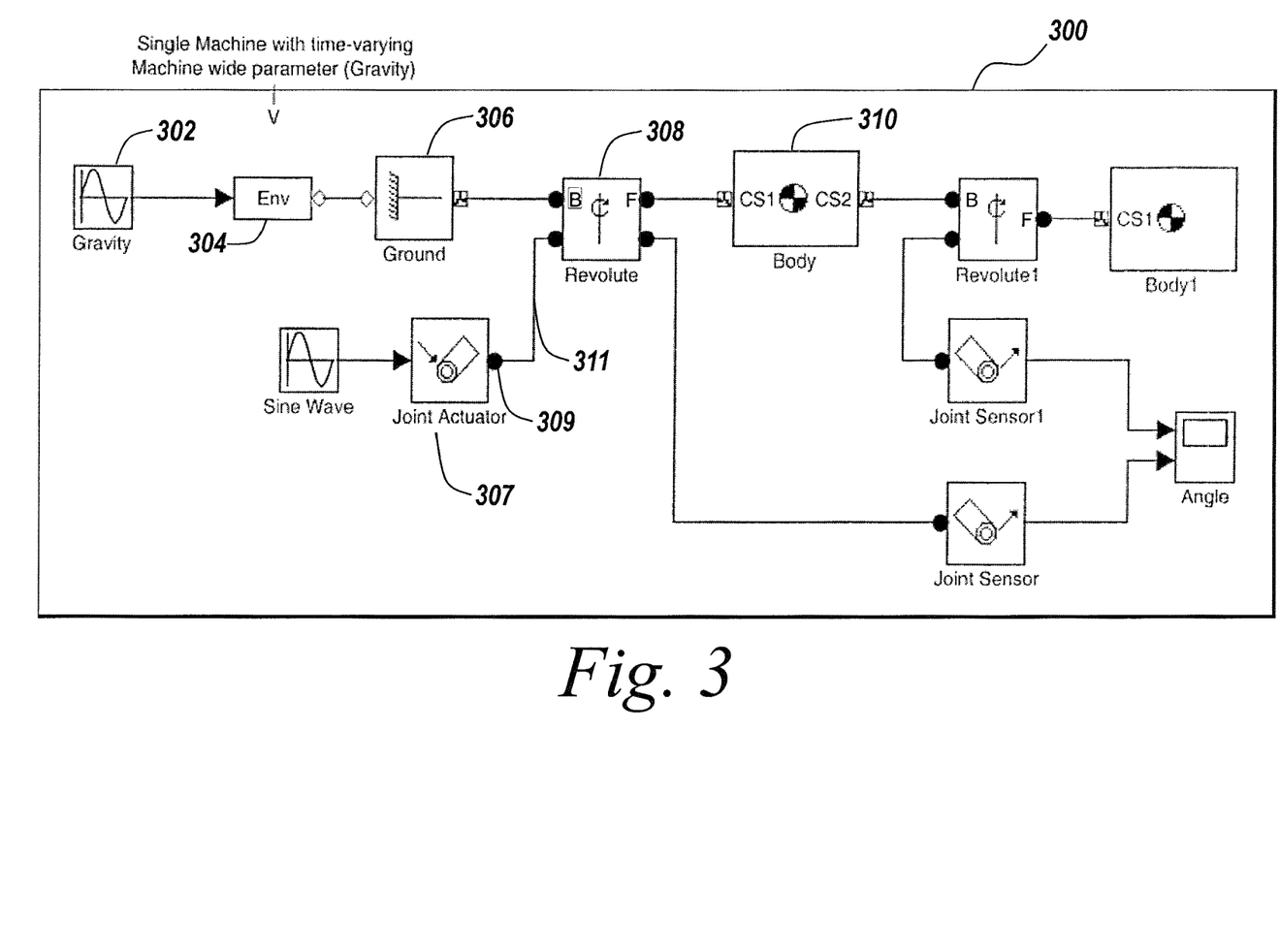
FIG. 3 is a sample embodiment of a graphical language model of a single machine that has a time-varying model wide parameter associate with it.

FIG. 3 is an illustrative example of a graphical block diagram model 300 wherein a parameterization block 304 is associated with the model 300, such that the parameterization block may provide properties to the model based upon data received from a variable signal element 302. In one embodiment, data provided to the model 300 from the variable signal element 302 can be as a function of time. In light of this, the output of the parameter block 304 is variable in nature, and therefore the model environment 300 is in constant state of flux. As evidenced in FIG. 3, a single parameter block 304 is associated with the traditional block diagram model environment 300 such that all elements 306, 308, 310 within the model are provided with the same variable parameter output by the parameter block 304. In light of this, a change in the output of the parameterization node 304 based upon a signal received by the variable signal element 302 will be propagated across all elements within the block diagram model environment. One skilled in the art will readily recognize that the parameterization block 304 may be readily associated with a plurality of regions within the model 300. Using such an arrangement, a plurality of time variable model parameters may be monitored using a parameterization block 304 associated with a region of the model 300. One such example of a parameterization block associated with the model for use in providing time variable data is evidenced in the second parameterization block 307 of FIG. 3. The second parameterization block 307 may provide data 311 to a user of the graphical block diagram model environment via an output port 309 associated with the second parameterization block 307. One skilled in the art will readily recognize that data supplied to a user may include, but is not limited to, data such as the center of gravity of the system, the total kinetic energy of the system, or the total momentum of the system.

Figure 4:
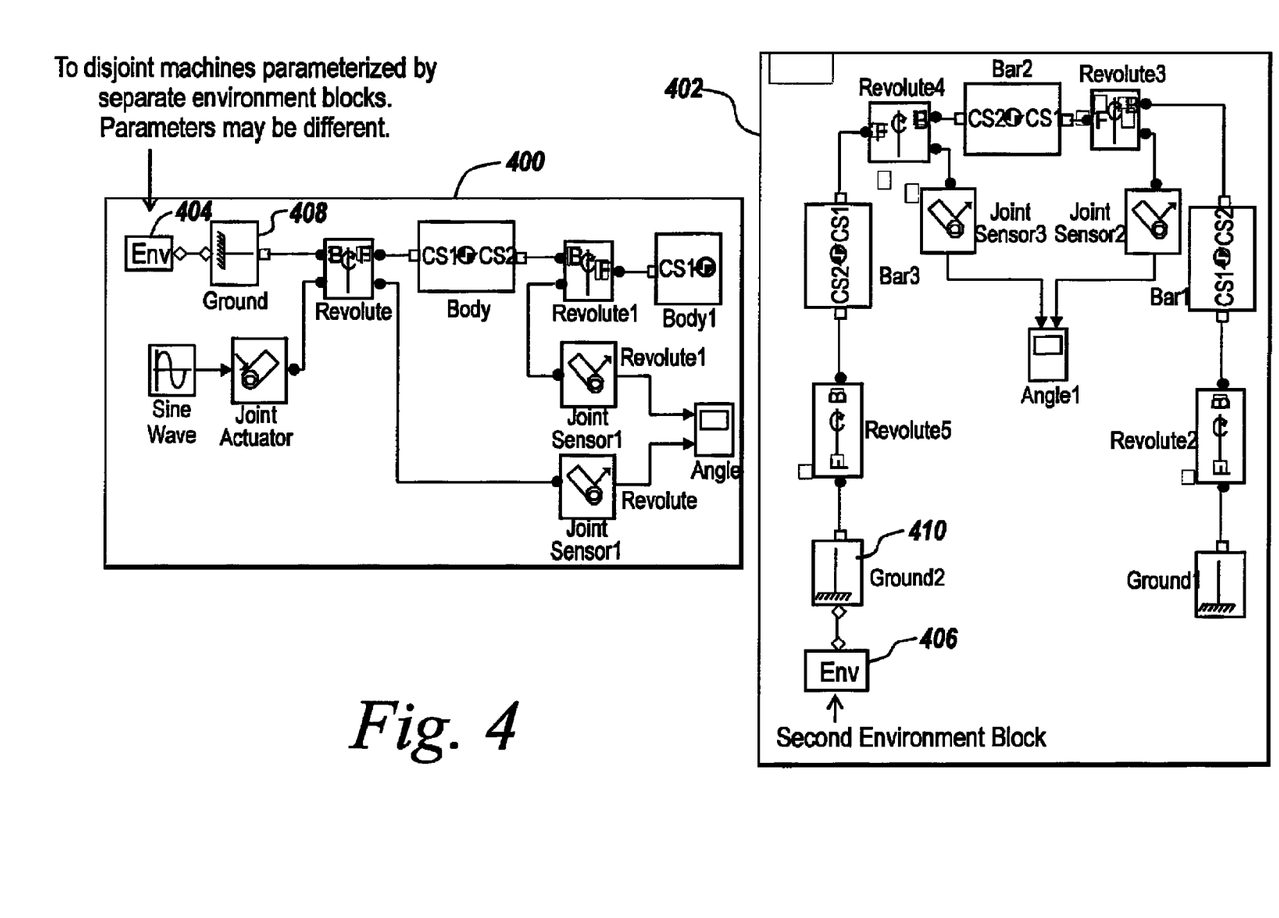
FIG. 4 is an illustrative example of a traditional graphical language environment in lieu of a graphical model that contains two distinct parameters that are to propagate across different regions of a graphical language model.
Figure 5:
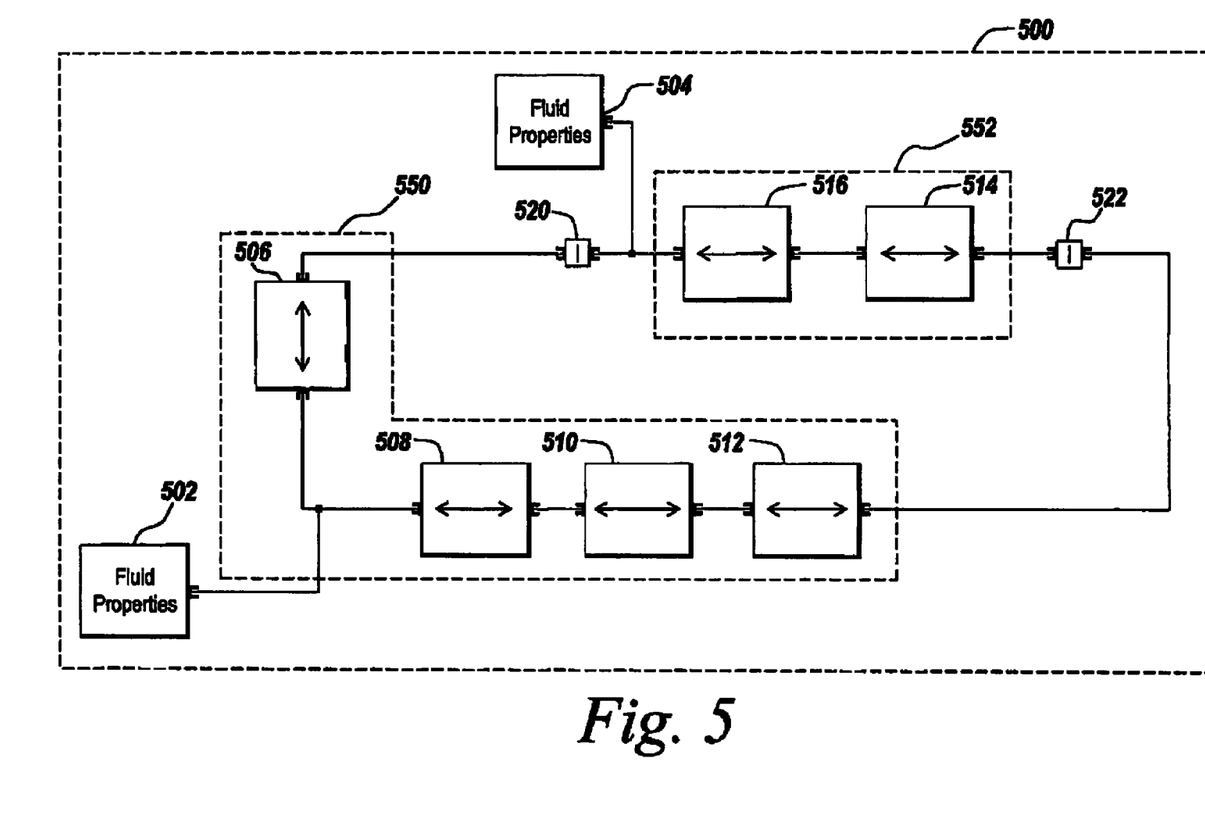
FIG. 5 is an illustrative graphical language environment for use in practicing an embodiment of the present invention.

FIG. 4 is an illustrative example of a graphical language environment in lieu of a graphical model that contains two distinct parameters that are to propagate across different regions of a graphical language model. In the present example, this graphical language model is divided into a first sub-model 400 and a second sub-model 402 such that a first parameter block 404 can be associated with the first sub-model 400 and a second parameter block 406 can be associated with the second sub-model 402. While having distinct parameter blocks 404, 406 associated with them, these two sub-models 400, 402 can be interrelated, such that a change in a first sub-model 400 results in a change in the second sub-model when viewed from the perspective of an entire graphical language model. Using this technique, a change to the parameters in the first parameter block 404 in the first sub-model 400 are not propagate to the second sub-model 402. In one embodiment, the parameters provided to the first sub-model 400 may be continuously variable in nature, wherein the parameters provided to the second sub-model 402 via a second parameterization block 406 may be fixed. One skilled in the art will readily recognize that numerous combination of fixed, variable, or some combination thereof may be associated with the first sub-model 400 and the second sub-model 402. A user working with the first sub-model 400, for example, may readily change the parameters propagated to the sub-model 400 by simply changing the parameters associated with the first parameterization block 404. The need to initiate a model-wide parameterization schema, as required by the prior art, in no longer necessary. Such an arrangement therefore offers the ability to model time-variable systems wherein quick changes to the parameters affecting the systems can be readily made. FIG. 5 is an illustrative graphical language environment for use in practicing an embodiment of the present invention. The graphical language model 500 of the present embodiment includes a first parameterization function 502 and a second parameterization function 504. In the present embodiment these parameterization functions are represented as blocks within a graphical language environment, but one skilled in the art will readily recognize that numerous alternative embodiments exist for representing the parameterization functions of the present embodiment. One skilled in the art will readily recognize that these parameter blocks can further include numerous parameterization function associated with the parameter block such that multiple parameterization functions can be saved and recalled such that the graphical language model can be tested under a variety of conditions. Furthermore the parameterization function can be user specified, can be automatically generated based upon the proposed graphical language model environment, or can be retrieved from numerous saved parameterization functions.

The parameterization functions 502, 504 of the present invention can specify the solve strategy to be used within the graphical language environment, can for example specify tolerances for nodes within the graphical language model 500, or can define an attribute of the physical environment that the nodes of the graphical langue operated in. These examples of parameters specified by the parameterization function are merely representative of applicable parameters and are not intended to constitute an exhaustive list. One skilled in the art will readily recognize that numerous alternate parameters can be specified by the parameterization function such that the graphical language model can be defined in a manner representative of the intended system to be modeled.

In addition to the parameterization function, a first partition block 520 and a second partition block 522 are provided for use with the graphical block diagram model. These partition blocks 520, 522 are associated with nodes within the graphical language environment and serve to define a distinct set of regions 550, 552 within the graphical language environment 500 wherein a parameter provided by the first parameterization function 502 propagates across, leaving the second parameterization function 504 to propagate a second region 552 of the graphical language environment. In the present example, the use of the dual partitioning blocks 520, 522 results in a first region 550 including nodes 506, 508, 510, 512, and a second region 552 comprising nodes 514, 516. In the present embodiment, the first region 550 is associated with a first parameterization function 502 such that a parameter provided by the first parameterization function 502 only propagates across those elements defined in the first region 550 of the graphical language environment 500. In contrast, the partitioning blocks 520, 522 additionally define a second region 552, comprising nodes 514 and 516, such that the second parameterization function 504 only propagates a parameter to these nodes within the second region 552.

The use of partition blocks 520,522 is such that these partition blocks can be manually introduced to the graphical language model by a user of the graphical language model. Using a manual introduction into the graphical language model, a user can then define which nodes the partition blocks are associated with.

In the alternative, these partition block 520,522 can be "smart blocks" such that upon insertion into the graphical language model, the partition blocks automatically determine the appropriate nodes which define a region, and further determine the applicable parameterization function for each region. In one embodiment, each domain can describe the required parameterization to an internal schema, This internal schema may be a text file, or in the alternative may be an application program interface. In practice, a user can select the "smart block" from a library contacting a plurality of blocks for use in the applicable environment and introduce the block to the model environment. Upon introduction of the block to the model environment, the block can provide a "connection callback" wherein the connection callback serves to notify the model that a "smart block" has been connected to the model. Following the connection callback, the smart block polls neighboring blocks to determine the domain with which they are associated. Upon resolving the domain, the smart block then inspects the internal schema registered earlier and configure itself to represent the parameterization applicable to the domain of the connected blocks.

In light of this, a graphical language model is created wherein a first and second region, 550, 552 respectively, exits that can contain distinct parameters associated with the separate regions, yet the effects of a change in one region can be incorporated into the second region since both regions are part of a single graphical language model. Such an ability to incorporate two or more parameterization components into a single graphical language model is currently difficult, if not impossible to due in the prior art.

The graphical language model detailed above is best explained by example. In the present example, as detailed in FIG. 5, should a change in the fluid parameters of the first parameterization function 502 occur, this change is propagated to nodes 506, 508, 510 and 512 within the first region 550. In contrast, the fluid properties in the second region 552, as provided by the second parameterization function 504, are such that changes to these parameters only effect nodes 514 and 516. The graphical language model 500, when viewed as a whole, however, is such that each region 550, 552 operates in conjunction with each other such that the entire system, contain two distinct regions 550, 552 containing two sets of parameters, as provided by two parameterization function 502, 504, operates as a single integrated graphical model environment 500. In light of such use of partitioning block and dual parameter blocks 502, 504, the need to split the graphical language model into two or more distinct sub-models in no longer necessary.

Figure 6:
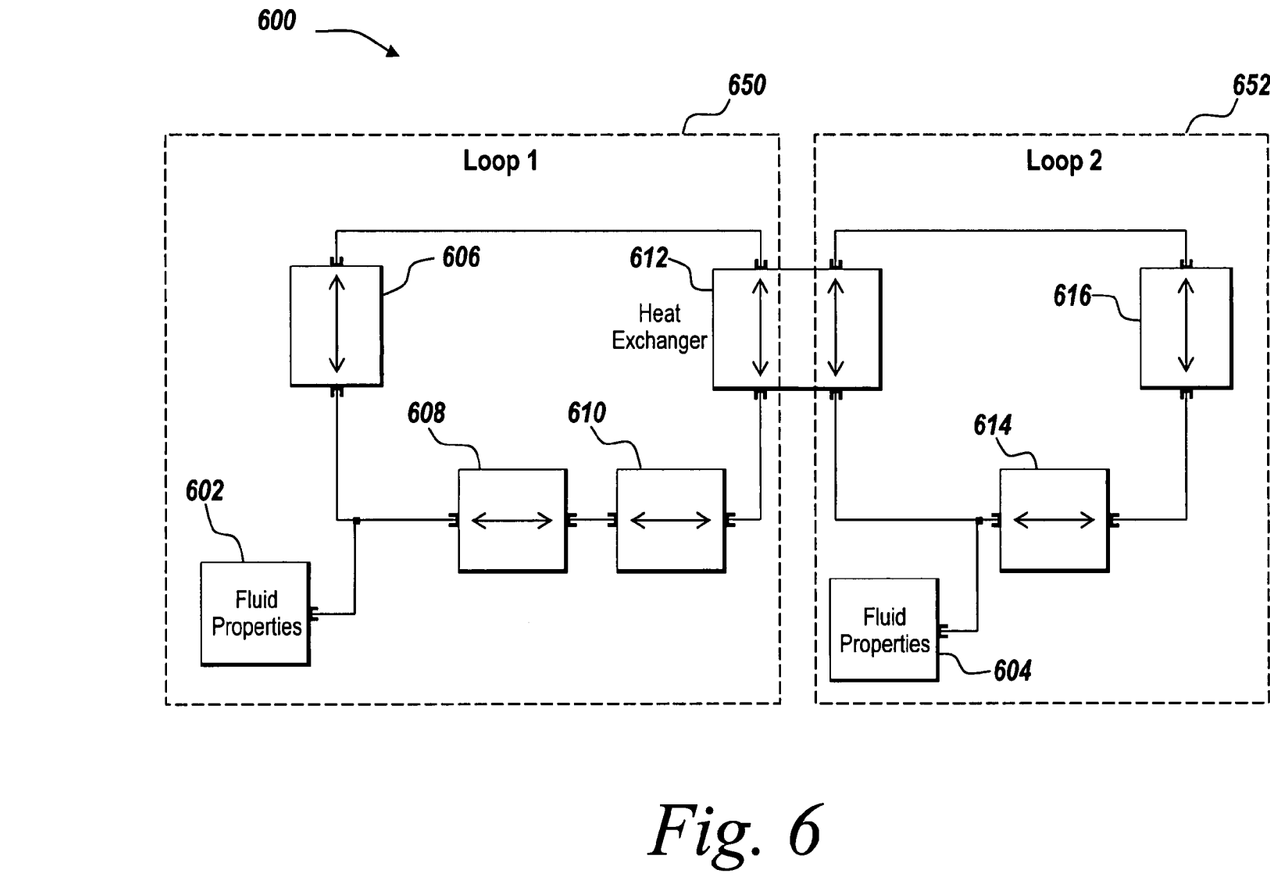
FIG. 6 is an illustrative graphical embodiment of a system for use with the present invention, wherein the system is divided into two regions.

FIG. 6 is an illustrative graphical embodiment of a system for use with the present invention. In FIG. 6 a graphical language model 600 is defined to include two distinct regions, namely a first region 650 and a second region 652. The first region in the present embodiment contains node 1 606, node 2 608, node 3 610 and a heat exchanger node 612. Further associated with the first region 650 is a parameterization function 602. In the illustrative embodiment the parameterization function 602 provides a fluid property parameter for use in the first region 650. One skilled in the art, however, will readily recognize that numerous alternative properties could be provided by the first parameterization function 602. For example, a mass flow property for the fluid could be provided, or a temperate parameter for the fluid can be defined for use in the first region 650 of the graphical language model 600. The sample parameters are solely illustrative of potential parameters defined by the parameterization component are not intended to limit the scope of potential parameters to be defined by the first parameterization function 602.

The second region 652 of the graphical language model 600 includes node 4 614, node 5, 616 and the heat exchanger node 612. Associated with these nodes is a second parameterization function 604 capable of defining a parameter for use with the second region 652. As set forth prior, numerous parameters can be defined in relation to the second parameterization function 604 and the second region 652.

Using a first and second parameterization function 602, 604, multiple parameters can be defined for use with the first region 650 and second region 652 such that the graphical language model 600 is not limited to a single parameterization function as understood in the existing art. Using such an arrangement, changes in the fluid properties of the first parameterization function 602, for example, can be first propagated through all the nodes in the first region 650 and, in turn, can result in a change in the second region 652 of the graphical language model 600. Allowing two or more regions to exist within a single graphical language model 600 such as this offers the benefit of monitoring the changes in all regions of the model following the change in a portion of the model via a change in a parameterization function parameter. Additionally, the need to split complex models which contain multiple parameters associated with diverse regions of the graphical language model 600 is no longer necessary. The result of a change in one region is simultaneously reflected in a second associated region.

Figure 7:
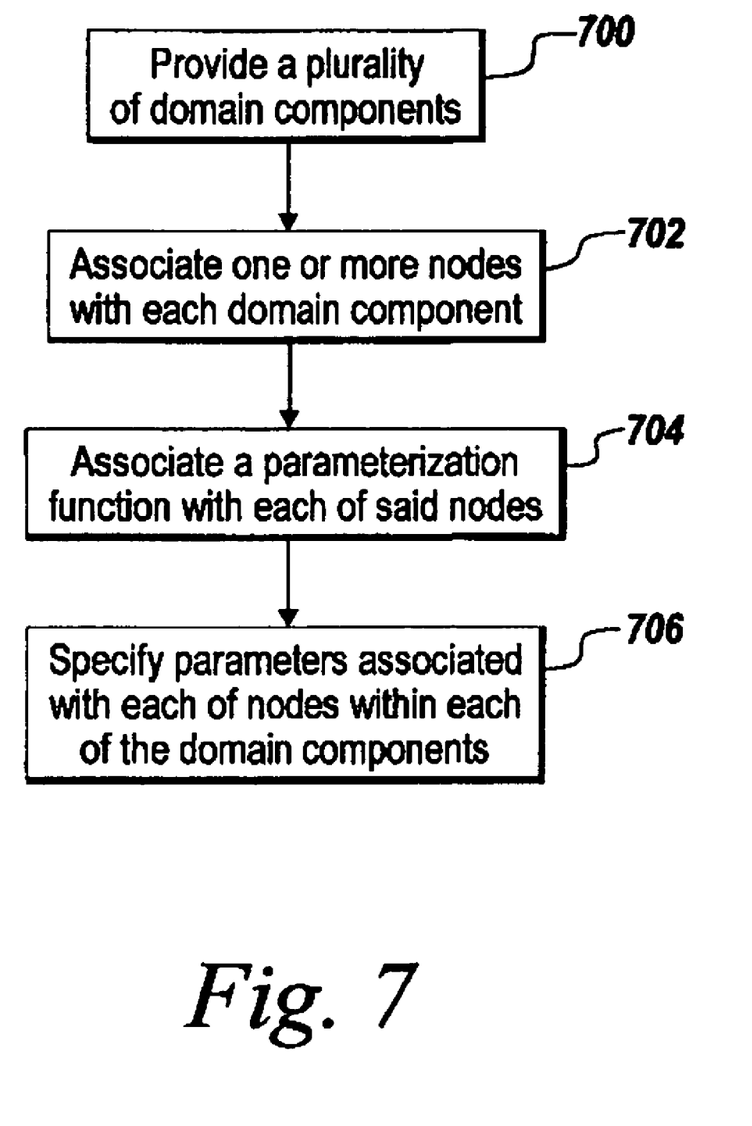
FIG. 7 of the present invention is a flowchart illustrating the steps required for extending a graphical simulation language in accordance with one embodiment of the present invention.

FIG. 7 of the present invention is a flowchart illustrating the steps required for extending a graphical simulation language in accordance with one embodiment of the present invention.

In accordance with step 700, a plurality of domain components are provided within the graphical simulation language. These domain components can be automatically defined by the graphical simulation language, or can be manually configured by a user of the graphical simulation language. In accordance with step 702, one or more nodes are then associated with each of the domain components. For example, in one embodiment a first domain component may have three nodes associated with it, while a second domain component may have four different nodes associated with it. Each node then has a parameterization function associated with it, in accordance with step 704, such that all nodes within one domain have the same parameterization function associated with the domain, and all nodes within an alternate domain have a different parameterization function associated with them. The parameterization function associated with one or more nodes is such that parameters such as environmental properties, solver strategies, or solver tolerances. Furthermore in accordance with step 706, the parameters associated with each of the nodes within a domain component are specified.

Figure 8:
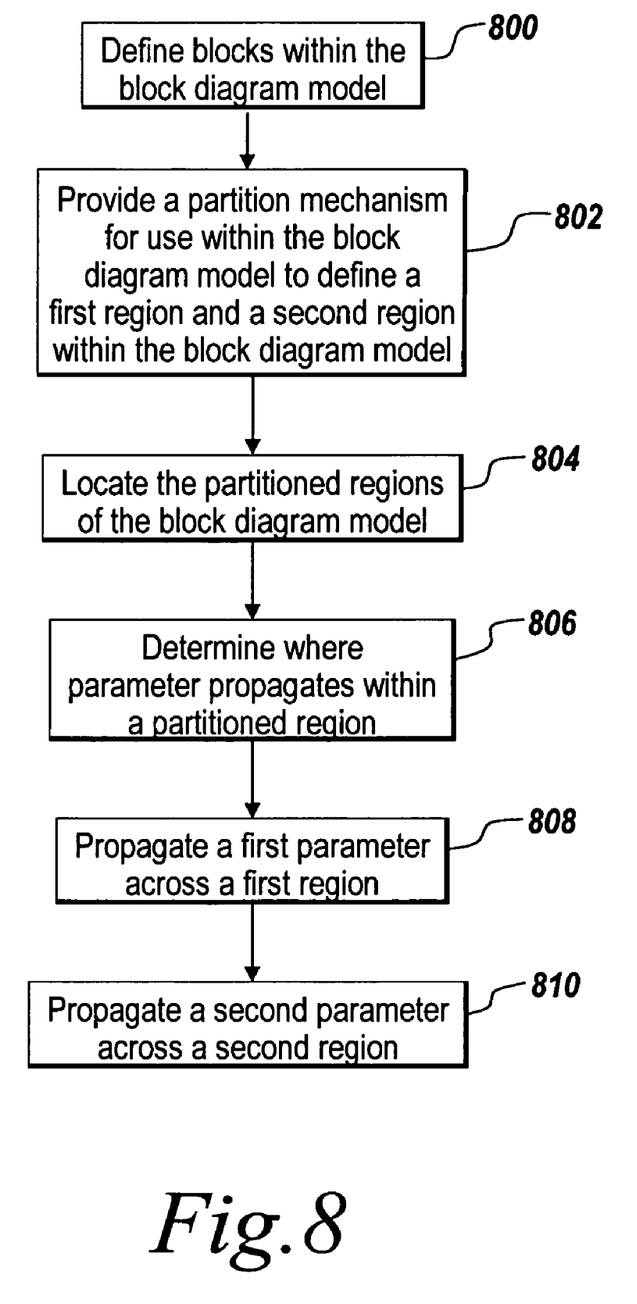
FIG. 8 of the present application illustrates a flow chart reciting the method for proving a plurality of environmental parameter within a block diagram model.

FIG. 8 of the present application illustrates a flow chart reciting the method for providing a plurality of environmental parameter within a block diagram model. In accordance with step 800 the blocks within the block diagram model are defined such that the relationship between blocks is determined. Additionally, a partition mechanism is provided such that a first and second region can be defined within the block diagram model (Step 802). These first and second regions can contain one or more blocks each, and in combination the first and second regions can represent the complete block diagram model. In accordance with step 804, the partitioned regions of the block diagram model are located such that a determination can be made as to the scope of parameter propagation with the partitioned regions (step 806). Following such a determination, a first parameter can be propagated across a first region (step 808) and a second parameter can be propagated across a second region (810) in accordance with an embodiment of the present invention.

The present invention has been described by way of example, and modifications and variations of the described embodiments will suggest themselves to skilled artisans in this field without departing from the spirit of the invention.

Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

We claim:

1. A computer-implemented method for associating multiple domains with a block diagram model, the computer-implemented method comprising:
    providing a first domain and a second domain within the block diagram model, the first domain comprising one or more nodes having a first function specifying parameters associated with the one or more nodes of the first domain, and the second domain comprising one or more nodes having a second function specifying parameters associated with the one or more nodes of the second domain, the parameters associated with the one or more nodes of the first domain or the parameters associated with the one or more nodes of the second domain specifying solver strategies or solver tolerances to be used in simulating the block diagram model;
    providing a plurality of partitioning blocks for defining a first region and a second region of the block diagram model;
    associating the first domain with the first region of the block diagram model;
    associating the second domain with the second region of the block diagram model; and
    passing parameters specific to the first domain to the associated first region of the block diagram model using the first function, not passing the parameters specific to the first domain to the second region of the block diagram model.

2. The computer-implemented method of claim 1, wherein the plurality of partitioning blocks are manually configured to associate the first and second domains with the first and second respective regions of the block diagram model.

3. The computer-implemented method of claim 1, wherein the plurality of partitioning blocks are automatically configured to associate the first and second domains with the first and second respective regions of the block diagram model.

4. A computer-implemented method for extending a graphical simulation language, the computer-implemented method comprising:
    providing a plurality of domain components;
    providing a plurality of parameterization functions;
    providing one or more partitioning blocks associated with the graphical simulation language;
    associating a plurality of nodes with a domain component using the one or more partitioning blocks, the plurality of nodes being distinct from the plurality of parameterization functions;
    associating a parameterization function with the plurality of nodes within a domain component, the parameterization function specifying parameters associated with the plurality of nodes within the domain component; and
    providing the specified parameters to the plurality of nodes associated with the parameterization function within the domain component using the parameterization function, and not providing the specified parameters associated with the plurality of nodes within the domain component to a second domain component.

5. The computer-implemented method of claim 4, wherein the graphical simulation language is a block diagram model environment.

6. The computer-implemented method of claim 4, wherein the parameterization function is manually configured for use in extending the graphical simulation language.

7. The computer-implemented method of claim 4, wherein the parameterization function is automatically configured for use in extending the graphical simulation language.

8. The computer-implemented method of claim 4, wherein the parameterization function specifies solver strategy for use with the graphical simulation language.

9. The computer-implemented method of claim 4, wherein the parameterization function specifies a physical environment of the graphical simulation language.

10. The computer-implemented method of claim 4, wherein the parameterization function is a gravity vector.

11. A computer-implemented method for providing a plurality of environmental parameters within a block diagram model, the computer-implemented method comprising:
    defining blocks within the block diagram model;
    providing a plurality of partitioning blocks for use within the block diagram model to define a first region and a second region of the block diagram model;
    locating the partitioned regions of the block diagram model partitioned by the plurality of partitioning blocks;
    determining a destination to which an environmental parameter is passed, the environmental parameter being an attribute of a physical environment where the blocks of the block diagram model operate;
    passing a first of the plurality of environmental parameters to a first of the partitioned regions of the block diagram model without passing the first of the plurality of environmental parameters to other partitioned regions of the block diagram model; and
    passing a second of the plurality of environmental parameters to a second of the partitioned regions of the block diagram model without passing the second of the plurality of environmental parameters to other partitioned regions of the block diagram model.

12. The computer-implemented method of claim 11, wherein the plurality of partitioning blocks are manually configured for use with the block diagram model.

13. The computer-implemented method of claim 11, wherein the plurality of partitioning blocks are automatically configured for use with the block diagram model.

14. The computer-implemented method of claim 11, wherein the environmental parameter specifies system gravity components.

15. The computer-implemented method of claim 11, wherein the environmental parameter specifies temperature.

16. A computing device for associating multiple domains within a block diagram model, the computing device comprising:
    a processor for executing:
        a plurality of partitioning blocks for use in defining a first region and a second region of a block diagram model;
        a first mechanism for associating a first domain with the first region of the block diagram model, the first domain comprising one or more nodes having a first function representing parameters associated with the one or more nodes of the first domain, parameters specific to the first domain being passed to the first region of the block diagram model without being passed to the second region of the block diagram model using the first function; and
        a second mechanism for associating a second domain with the second region of the block diagram model, the second domain comprising one or more nodes having a second function representing parameters associated with the one or more nodes of the second domain, parameters specific to the second domain being passed to the second region of the block diagram model without being passed to the first region of the block diagram model using the second function.

17. The computing device of claim 16, wherein the plurality of partitioning blocks further comprises a manual configuration mechanism, the manual configuration mechanism allowing association of the first domain and the second domain with the first region and the second region of the block diagram model.

18. The computing device of claim 16, wherein the plurality of partitioning blocks further comprises an automatic configuration mechanism, the automatic configuration mechanism allowing automatic association of the first domain and the second domain with the first region and the second region of the block diagram model.

19. The computing device of claim 16, further comprising a first parameterization component, the first parameterization component being associated with the first domain.

20. The computing device of claim 19, wherein the first parameterization component specifies solver strategies and tolerances within the first domain associated with the first parameterization component.

21. The computing device of claim 16, further comprising a second parameterization component, the second parameterization component being associated with the second domain.

22. The computing device of claim 21, wherein the second parameterization component specifies solver strategies and tolerances within the second domain associated with the second parameterization component.

23. A computing device for extending a graphical simulation language comprising:
  a processor for executing:
    a plurality of domain components, a domain component comprising a plurality of nodes;
    a plurality of parameterization nodes, a parameterization node being associated with one of the plurality of domain components;
    one or more partitioning blocks associated with a graphical simulation language for defining each of the plurality of parameterization nodes; and
    a plurality of parameterization functions distinct from the plurality of parameterization nodes, one of the plurality of parameterization functions being associated with one of the plurality of parameterization nodes, the one of the plurality of parameterization functions specifying parameters associated with a parameterization node that is associated with the one of the plurality of domain components, the one of the plurality of parameterization functions providing the specified parameters to the plurality of nodes associated with the one of the plurality of domain components and the one of the plurality of parameterization functions not providing the specified parameters associated with the parameterization node that is associated with the one of the plurality of domain components to a second domain component.

24. The computing device of claim 23, wherein the plurality of domain components further comprises a plurality of graphical block diagram blocks for use in the graphical simulation language.

25. The computing device of claim 23, wherein the parameterization node is manually configured for use in extending the graphical simulation language.

26. The computing device of claim 23, wherein the parameterization node is automatically configured for use in extending the graphical simulation language.

27. The computing device of claim 23, wherein the one of the plurality of parameterization functions further comprises a method for specifying solver strategy for use with the graphical simulation language.

28. The computing device of claim 23, wherein the one of the plurality of parameterization functions further comprises a method for specifying a physical environment of the graphical simulation language.

29. The computing device of claim 23, wherein at least one of the plurality of parameterization functions is a gravity vector.

30. A non-transitory installation medium storing instructions executable in an electronic device that provides a block diagram graphical environment for modeling a system, the non-transitory installation medium storing:
  one or more instructions for providing a first domain and a second domain within a block diagram model, the first domain comprising one or more nodes having a first function specifying parameters associated with the one or more nodes of the first domain, and the second domain comprising one or more nodes having a second function specifying parameters associated with the one or more nodes of the second domain, the parameters associated with the one or more nodes of the first domain or the parameters associated with the one or more nodes of the second domain specifying solver strategies or solver tolerances to be used in simulating the block diagram model;
  one or more instructions for providing a plurality of partitioning blocks for defining a first region and a second region of the block diagram model;
  one or more instructions for associating the first domain with the first region of the block diagram model;
  one or more instructions for associating the second domain with the second region of the block diagram model; and
  one or more instructions for passing parameters specific to the first domain to the associated first region of the block diagram model using the first function, not passing the parameters specific to the first domain to the second region of the block diagram model.

31. The non-transitory installation medium of claim 30, wherein the plurality of partitioning blocks are manually configured to associate the first and second domains with the first and second respective regions of the block diagram model.

32. The non-transitory installation medium of claim 30, wherein the plurality of partitioning blocks are automatically configured to associate the first and second domains with the first and second respective regions of the block diagram model.

33. A non-transitory installation medium storing instructions executable in an electronic device that provides a plurality of environmental parameters within a block diagram model for modeling a system, the non-transitory installation medium storing:
  one or more instructions for defining blocks within the block diagram model;
  one or more instructions for providing a plurality of partitioning blocks for use within the block diagram model to define a first region and a second region of the block diagram model;
  one or more instructions for locating the partitioned regions of the block diagram model partitioned by the plurality of partitioning blocks;

one or more instructions for determining a destination to which an environmental parameter is passed, the environmental parameter being an attribute of a physical environment where the blocks of the block diagram model operate;

one or more instructions for passing a first of the plurality of environmental parameters to a first of the partitioned regions of the block diagram model without passing the first of the plurality of environmental parameters to other partitioned regions of the block diagram model; and one or more instructions for passing a second of the plurality of environmental parameters to a second of the partitioned regions of the block diagram model without passing the second of the plurality of environmental parameters to other partitioned regions of the block diagram model.

34. The non-transitory installation medium of claim 33, wherein the plurality of partitioning blocks are manually configured for use with the block diagram model.

35. The non-transitory installation medium of claim 33, wherein the plurality of partitioning blocks are automatically configured for use with the block diagram model.

36. The non-transitory installation medium of claim 33, wherein the environmental parameter specifies system gravity components.

37. The non-transitory installation medium of claim 33, wherein the environmental parameter specifies temperature.

38. The non-transitory installation medium of claim 33, wherein the environmental parameter specifies a gravity vector.

* * * * *